(12) United States Patent
Ferreira et al.

(10) Patent No.: US 11,467,934 B2
(45) Date of Patent: Oct. 11, 2022

(54) DIAGNOSTIC SCAN

(71) Applicant: Lenovo (Singapore) Pte. Ltd., Singapore (SG)

(72) Inventors: Marcelo Ferreira, Campinas (BZ); Rafael Rodrigues Machado, Sorocaba (BZ); Fellipe Augusto Ruiz de Souza, Sorocaba (BZ); Emerson Freitas Cardoso, Sorocaba (BZ)

(73) Assignee: Lenovo (Singapore) Pte. Ltd., Singapore (SG)

( * ) Notice: Subject to any disclaimer, the term of this patent is extended or adjusted under 35 U.S.C. 154(b) by 109 days.

(21) Appl. No.: 16/237,274

(22) Filed: Dec. 31, 2018

(65) Prior Publication Data

US 2020/0210300 A1 Jul. 2, 2020

(51) Int. Cl.
*G06F 11/00* (2006.01)
*G06F 11/22* (2006.01)
*G06F 11/07* (2006.01)
*G06F 11/32* (2006.01)

(52) U.S. Cl.
CPC ...... *G06F 11/2294* (2013.01); *G06F 11/0787* (2013.01); *G06F 11/2284* (2013.01); *G06F 11/321* (2013.01)

(58) Field of Classification Search
CPC .................................................. G06F 11/2294
See application file for complete search history.

(56) References Cited

U.S. PATENT DOCUMENTS

| | | | | |
|---|---|---|---|---|
| 5,732,268 A | * | 3/1998 | Bizzarri | G06F 11/0748 713/2 |
| 5,978,912 A | * | 11/1999 | Rakavy | G06F 9/4416 713/2 |
| 6,324,644 B1 | * | 11/2001 | Rakavy | G06F 9/4416 713/1 |
| 7,225,245 B2 | * | 5/2007 | Gurumoorthy | H04L 41/046 709/202 |
| 2006/0048006 A1 | * | 3/2006 | Lou | G01R 31/31705 714/25 |
| 2009/0228474 A1 | * | 9/2009 | Chiu | G06F 16/9024 |
| 2016/0371163 A1 | * | 12/2016 | Swierk | G06F 11/2294 |
| 2016/0378602 A1 | * | 12/2016 | Herzi | G06F 9/4401 714/2 |
| 2016/0378603 A1 | * | 12/2016 | Herzi | G06F 11/1417 714/6.12 |
| 2017/0060598 A1 | * | 3/2017 | Hughes | G06F 9/4416 |
| 2017/0344420 A1 | * | 11/2017 | Seibert | G06F 11/079 |
| 2019/0050234 A1 | * | 2/2019 | Segal | G06F 11/302 |
| 2019/0065300 A1 | * | 2/2019 | Lo | G06F 11/36 |
| 2019/0137567 A1 | * | 5/2019 | Lambert | G01R 31/31705 |
| 2020/0034237 A1 | * | 1/2020 | Suryanarayand | G06F 11/0709 |
| 2020/0042324 A1 | * | 2/2020 | Ayolasomyajula | H04L 63/20 |
| 2020/0042391 A1 | * | 2/2020 | Pepper | G06F 11/1417 |
| 2020/0278879 A1 | * | 9/2020 | Behera | H04L 45/586 |

* cited by examiner

*Primary Examiner* — Amine Riad
(74) *Attorney, Agent, or Firm* — Ference & Associates LLC

(57) ABSTRACT

One embodiment provides a method, including: receiving, at an information handling device and in a pre-operating system (OS) environment, an indication to run a diagnostic application; conducting, using the diagnostic application, a diagnostic scan on one or more of the information handling device components; and generating, based on the diagnostic scan, a results report. Other aspects are described and claimed.

12 Claims, 3 Drawing Sheets

DIAGNOSTIC SCAN

BACKGROUND

Prior to consumer use, several types of information handling devices ("devices"), for example laptops and notebooks, personal computers, other electronic devices, and the like, are often tested during the manufacturing process to ensure that the integrated hardware and firmware is functioning properly. This diagnostic process is generally conducted by one or more technicians that physically interact with the device to run hardware tests. Responsive to identifying any issues, the technicians may record, report, and/or fix the issue.

BRIEF SUMMARY

In summary, one aspect provides a method, comprising: receiving, at an information handling device and in a pre-operating system (OS) environment, an indication to run a diagnostic application; conducting, using the diagnostic application, a diagnostic scan on one or more of the information handling device components; and generating, based on the diagnostic scan, a results report.

Another aspect provides an information handling device, comprising: a processor; a memory device that stores instructions executable by the processor to: receive, in a pre-operating system (OS) environment, an indication to run a diagnostic application; conduct, using the diagnostic application, a diagnostic scan on one or more of the information handling device components; and generate, based on the diagnostic scan, a results report.

A further aspect provides a product, comprising: a storage device that stores code, the code being executable by a processor and comprising: code that receives an indication to run a diagnostic application in a pre-operating system (OS) environment; code that conducts a diagnostic scan on one or more information handling device components; and code that generates a results report based on the diagnostic scan.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
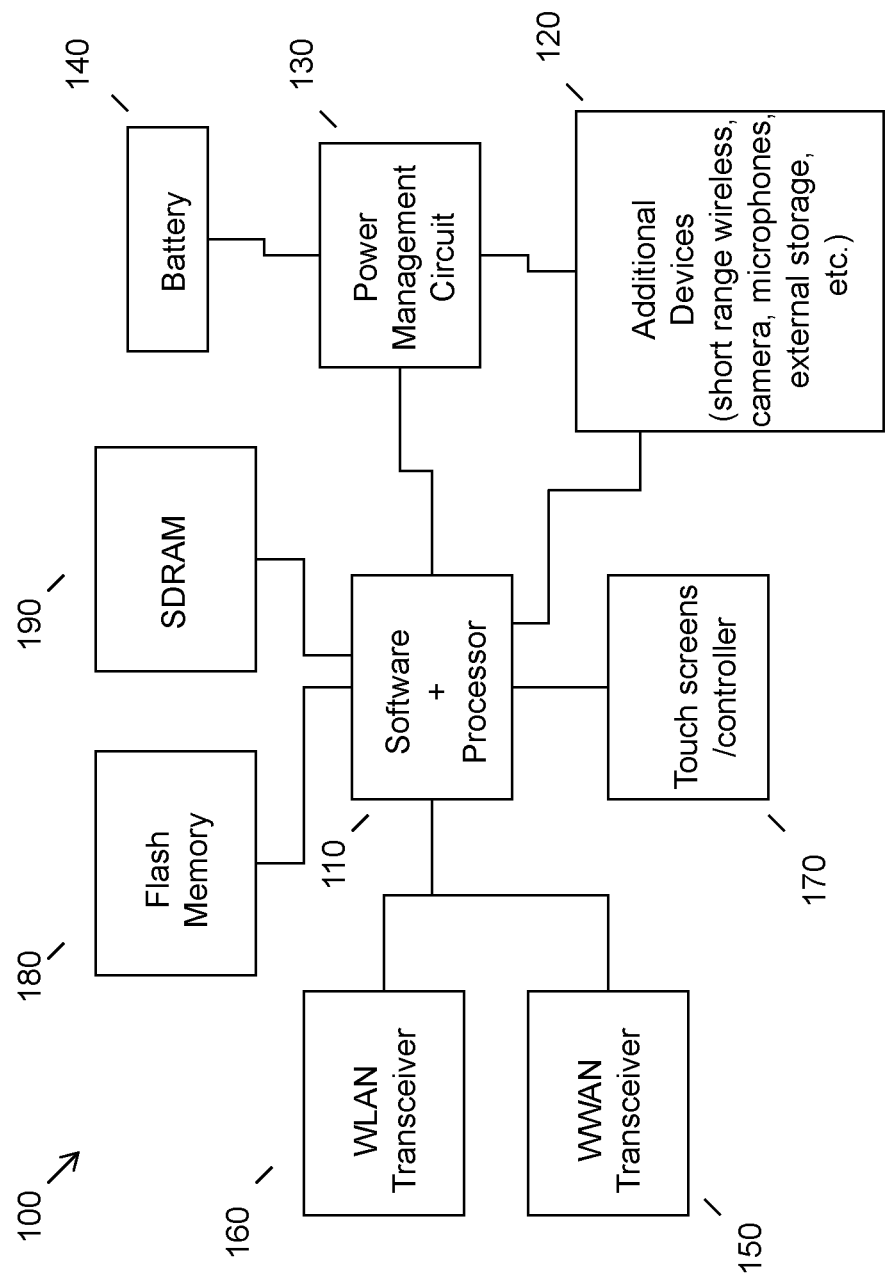
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

At present, Unified Extensible Firmware Interface (UEFI) is utilized during the manufacturing process to test the diagnostics of a computer system. More particularly, after a computer system is assembled, diagnostic tests are performed in order to make sure that the hardware is functioning properly. These tests are generally performed before an operating system (OS) takes control of the platform. Accordingly, these diagnostics are generally executed in a pre-OS environment in which the UEFI is still running. To perform these tests, one or more technicians normally have to interact with the devices to deploy some diagnostic applications. The diagnostic applications are oftentimes contained on USB devices that are introduced to a device system, by a technician, which will thereafter be used to run one or more diagnostic tests.

A variety of issues and concerns exist with this conventional diagnostics method. For instance, such a method may scale poorly and produce bottlenecks in the process when a large volume of devices need to be tested. More particularly, each time a diagnostic test needs to be administered, a human operator must be present, which increases the time and cost needed to perform the cumulative testing. A security issue also exists in that a USB device may be infected with some type of malicious software (e.g., by the technician, a third party, another bad actor, etc.) that, when introduced to the computer system, may cause negative effects to one or more hardware or software components. Additionally, manufacturing target pressures may also exist (e.g., to meet a predetermined production volume, etc.) that may tempt a technician to overlook or hide a problem with a device that may require extensive time to fix. Furthermore still, if there is an update to the diagnostic application, this update cannot be implemented remotely and may require each of the USB devices to be manually updated in turn.

Conventionally, there exists some PC diagnostics software that are stored on a server and thereafter remotely accessed by one or more client applications. However, these client applications operate in a post-OS environment. Accordingly, there are no known solutions that currently exist for the execution of remote diagnostic tests in a pre-OS environment.

Accordingly, an embodiment provides a method for running diagnostic tests on a pre-OS device without user interaction. In an embodiment, an indication may be received to run a diagnostic application. The diagnostic application may be received wirelessly (e.g., from a remote server, etc.) and may operate in a pre-OS environment with UEFI compatible firmware with network capabilities enabled. An embodiment may utilize the diagnostic application to conduct a diagnostic scan on one or more of the device hardware or software components. Based on the diagnostic scan, an embodiment may generate a result report that may identify any issues associated with the aforementioned components. Such a method may substantially eliminate the need for human user interaction in the diagnostics process.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
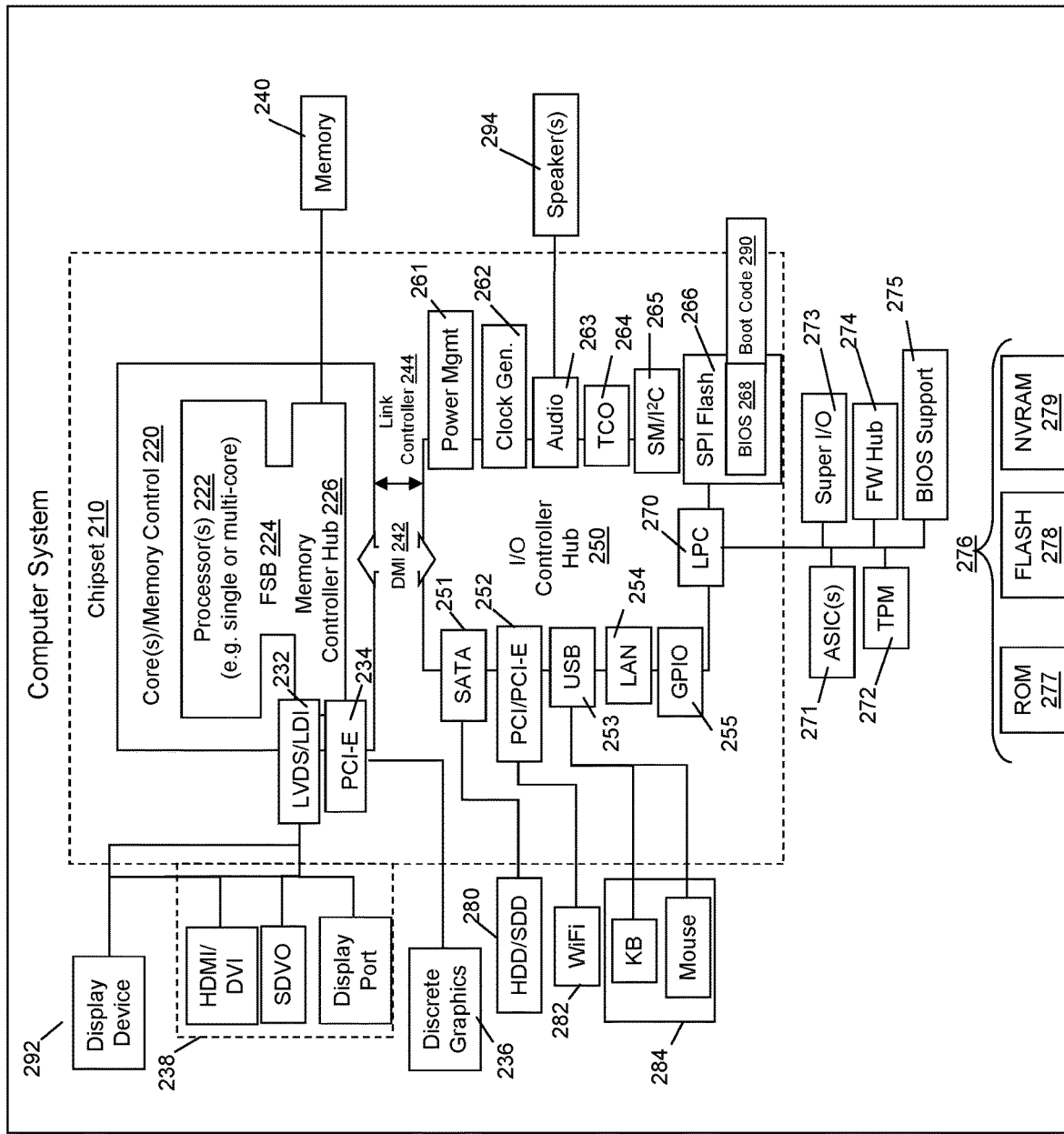
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptop and notebook computers, personal computer devices generally, and/or electronic devices that comprise UEFI firmware and wireless connection capabilities. For example, the circuitry outlined in FIG. 1 may be implemented in a tablet or smart phone embodiment, whereas the circuitry outlined in FIG. 2 may be implemented in a laptop embodiment.

Figure 3:
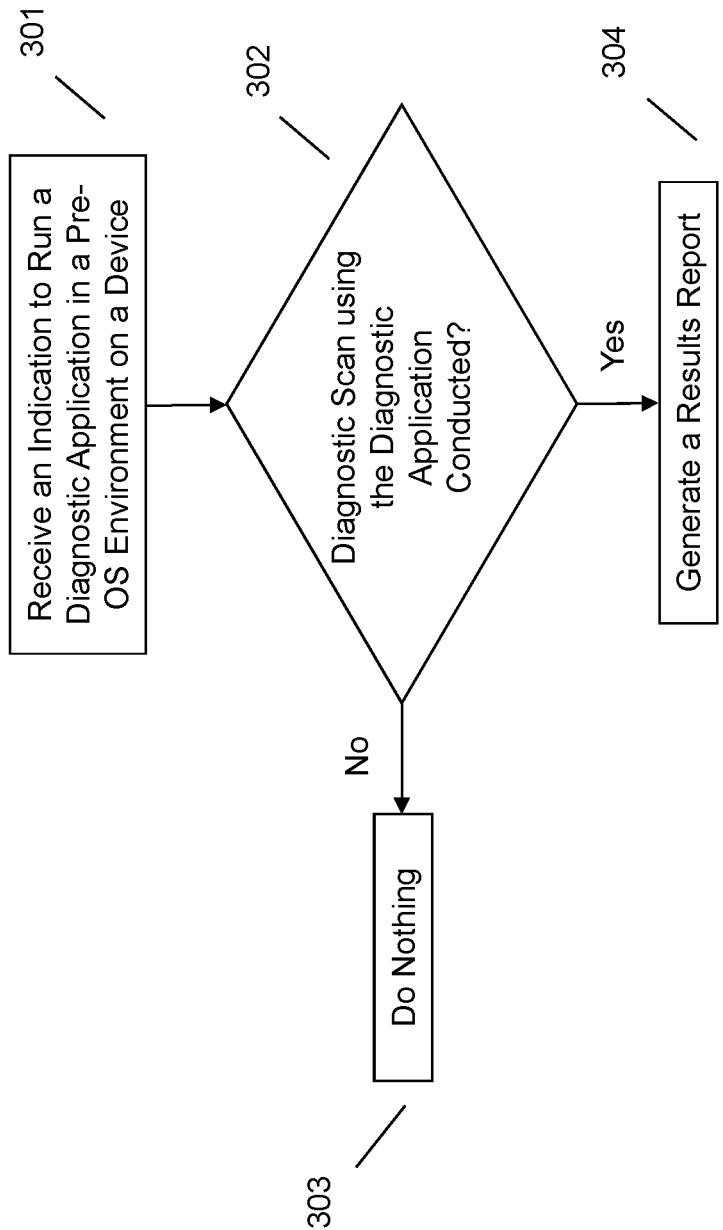
FIG. 3 illustrates an example method of performing a remote diagnostic scan.

Referring now to FIG. 3, an embodiment may assess the diagnostics of a device and execute them from a remote server in a pre-OS device environment without any physical user interaction. At 301, an embodiment may receive an indication to run a diagnostic application in a pre-OS environment. In the context of this application, a pre-OS environment may be an environment that does not comprise an OS but does comprise UEFI compatible firmware with wired or wireless network capabilities. In an embodiment, the indication may be a result of: a wireless request from a network server device to run a diagnostic application on the client device or the wireless receipt of the diagnostic application on the client device.

At 302, an embodiment may utilize the diagnostic application to conduct a diagnostic scan on one or more hardware or software components of the device. For instance, a client system of the underlying application may contain initially only a small loader application that can load specific versions of diagnostics from the network server and may also transmit any results obtained from the diagnostics to the network server, where they can be stored and accessed.

In an embodiment, the diagnostics scan may be conducted at the moment the diagnostic application is uploaded to the client device, at a predetermined time interval, etc. In an embodiment, the diagnostics scan may occur substantially simultaneously on two or more devices. For example, a network server may wish to run a diagnostics scan on a plurality of devices at once. In such a case, an embodiment may transmit a version of the diagnostic application to the target devices at substantially the same time. Such a process may dramatically decrease the time required to perform diagnostics on a device set. In a similar vein to the foregoing, an embodiment may provide an update to the diagnostic application prior to or while the application is being run on the client device.

If a diagnostic scan is not conducted, at 302, then an embodiment may, at 303, take no further action. Conversely, in an embodiment, responsive to conducting, at 302, the diagnostic scan, an embodiment may, at 304, generate a results report associated with the relative health of device components. In an embodiment, and in the context of this application, the results report may identify one or more issues, conditions, or statuses associated with any of the tested hardware or software components of the device.

In an embodiment, subsequent to the completion of the pre-OS diagnostic test and generation of the results report, an embodiment may transmit the results report to the network server for storage. Additionally or alternatively, an embodiment may make a copy of the results report to store on the client device or may transmit and store the results report at another accessible storage location (e.g., on another device, the cloud, etc.). The transmission of the results report may occur automatically (e.g., responsive to identification of the generation of the results report, etc.) or may be transmitted responsive to a user request. In an embodiment, results may be transmitted continually (e.g., as they are received, etc.). In another embodiment, the results may be transmitted at predetermined completion intervals (e.g., when the diagnostic test is 25% complete, 50% complete, etc.).

Additionally or alternatively, another embodiment may only transmit results when a particular issue with one of the device components is identified. For example, an embodiment may only transmit the results when a critical flaw or a known, severe issue is identified in one of the device components. If such a flaw or issue is identified, an embodiment may additionally notify a user of its existence (e.g., by emphasizing it in the results report, sending a dedicated message to the user concerning the issue, etc.).

The various embodiments described herein thus represent a technical improvement to conventional methods for running a diagnostic test on components of a device. Using the techniques described herein, an embodiment may receive an indication to run a diagnostic application in a pre-OS environment on a device. The diagnostic application may be received remotely, e.g., from a remote server, and an embodiment may thereafter conduct a diagnostic scan without the need for any human intervention. Responsive to the conduction of the scan, an embodiment may generate a results report that comprises a listing of any issues found with any of the hardware or software components of the device. The results report may thereafter be transmitted to another device, or location, for storage and reference. Such techniques may decrease the time and cost conventionally required to perform pre-OS diagnostic tests on devices. Additionally, the techniques described herein may also improve device security by limiting opportunities for application tampering by bad actors.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device and in a pre-operating system (OS) environment, an indication to run a diagnostic application, wherein the diagnostic application comprises an application stored on a remote data storage location, wherein the receiving comprises wirelessly receiving, from a network server while in the pre-operating system (OS) environment, the diagnostic application on the information handling device, wherein the pre-operating system environment comprises firmware with an ability to connect to a network using a wireless connection and does not comprise an operating system, wherein the information handling device comprises a loader application;
   conducting, using the diagnostic application, responsive to receiving the diagnostic application, and while in the pre-operating system environment, a diagnostic scan on one or more components of the information handling device, wherein the conducting comprises conducting the diagnostic scan without any physical user interaction, wherein the conducting comprises loading, using the loader application, versions of diagnostics from the network server;
   generating, without any physical user interaction, based on the diagnostic scan and while in the pre-operating system environment, a results report, wherein the results report identifies a health of the one or more components of the information handling device, wherein the generating the results reports comprises generating a copy of the results report; and
   transmitting, without any physical user interaction and using the loader application, the results report to the network server, wherein the transmitting the results reports comprises storing the copy of the results report in an additional accessible storage location.

2. The method of claim 1, wherein the pre-OS environment comprises Unified Extensible Firmware Interface (UEFI) compatible firmware.

3. The method of claim 1, wherein the results report identifies one or more conditions associated with the one or more of the information handling device components.

4. The method of claim 1, wherein the one or more of the information handling device components comprise one or more hardware components or software components.

5. The method of claim 1, wherein the diagnostic scan is run simultaneously on at least one other information handling device.

6. The method of claim 1, further comprising providing, responsive to identifying a critical flaw in the results report, a notification to a user.

7. An information handling device, comprising:
   a processor;
   a memory device that stores instructions executable by the processor to:
   receive, in a pre-operating system (OS) environment, an indication to run a diagnostic application, wherein the diagnostic application comprises an application stored on a remote data storage location, wherein to receive comprises wirelessly receiving, from a network server while in the pre-operating system (OS) environment, the diagnostic application on the information handling device, wherein the pre-operating system environment comprises firmware with an ability to connect to a network using a wireless connection and does not comprise an operating system, wherein the information handling device comprises a loader application;
   conduct, using the diagnostic application, responsive to receiving the diagnostic application, and while in the pre-operating system environment, a diagnostic scan on one or more components of the information handling device, wherein to conduct comprises conducting the diagnostic scan without any physical user interaction, wherein the conducting comprises loading, using the loader application, versions of diagnostics from the network server;
   generate, without any physical user interaction, based on the diagnostic scan and while in the pre-operating system environment, a results report, wherein the results report identifies a health of the one or more components of the information handling device, wherein the generating the results reports comprises generating a copy of the results report; and
   transmit, without any physical user interaction and using the loader application, the results report to the network server, wherein to transmit the results reports comprises storing the copy of the results report in an additional accessible storage location.

8. The information handling device of claim 7, wherein the pre-OS environment comprises Unified Extensible Firmware Interface (UEFI) compatible firmware.

9. The information handling device of claim 7, wherein the results report identifies one or more conditions associated with the one or more of the information handling device components.

10. The information handling device of claim 7, wherein the one or more of the information handling device components comprise one or more hardware components or software components.

11. The information handling device of claim 7, wherein the diagnostic scan is run simultaneously on at least one other information handling device.

12. A product, comprising:
    a storage device that stores code, the code being executable by a processor and comprising:

code that receives an indication to run a diagnostic application in a pre-operating system (OS) environment, wherein the diagnostic application comprises an application stored on a remote data storage location, wherein the code that receives comprises wirelessly receiving, from a network server while in the pre-operating system (OS) environment, the diagnostic application on the information handling device, wherein the pre-operating system environment comprises firmware with an ability to connect to a network using a wireless connection and does not comprise an operating system, wherein the information handling device comprises a loader application;

code that conducts a diagnostic scan, responsive to receiving the diagnostic application, and while in the pre-operating system environment, a diagnostic scan on one or more components of the information handling device, wherein the code that conducts comprises conducting the diagnostic scan without any physical user interaction, wherein the conducting comprises loading, using the loader application, versions of diagnostics from the network server;

code that generates, without any physical user interaction, a results report based on the diagnostic scan while in the pre-operating system environment, wherein the results report identifies a health of the one or more components of the information handling device, wherein the generating the results reports comprises generating a copy of the results report; and code that transmits, without any physical user interaction and using the loader application, the results report to the network server, wherein the code that transmits the results reports comprises storing the copy of the results report in an additional accessible storage location.

* * * * *